United States Patent [19]
Chiku et al.

[11] 3,883,367
[45] May 13, 1975

[54] SODIUM-SULFUR STORAGE BATTERY

[75] Inventors: Takewo Chiku, Toyota; Takeshi Kogiso, Nagoya; Kimie Kojima, Toyota; Takashi Yoshida, Nagoya, all of Japan

[73] Assignee: Kabushiki Kaisha Toyota Chuo Kenkyusho, Nagoya-shi, Japan

[22] Filed: Oct. 17, 1973

[21] Appl. No.: 407,197

[30] Foreign Application Priority Data
Oct. 19, 1972  Japan.................................. 104797

[52] U.S. Cl. ................ 136/6 F; 136/20; 136/83 R; 136/121
[51] Int. Cl. ......................................... H01m 35/02
[58] Field of Search ......... 136/6 F, 6 FS, 6 LF, 6 R, 136/83, 83 R, 100 R, 20, 121, 122; 423/447, 448; 252/502

[56] References Cited
UNITED STATES PATENTS

| | | | |
|---|---|---|---|
| 3,313,596 | 4/1967 | Hogg, Jr. et al. | 423/447 |
| 3,404,035 | 10/1968 | Kummer et al. | 136/6 FS |
| 3,413,150 | 11/1968 | Kummer et al. | 136/6 FS |
| 3,533,743 | 10/1970 | Prescott et al. | 423/447 |
| 3,635,675 | 1/1972 | Ezekiel | 423/448 X |
| 3,756,856 | 9/1973 | Tennenhouse | 136/6 FS |
| 3,767,773 | 10/1973 | Turner et al. | 423/447 |
| 3,770,502 | 11/1973 | Nakabayashi | 136/6 FS |

*Primary Examiner*—Anthony Skapars
*Attorney, Agent, or Firm*—Berman, Bishoff & Platt

[57] ABSTRACT

A sodium-sulfur storage battery having as part of its sulfur electrode a porous current collector formed of knitted or woven carbon or graphite yarn of high elastic modulus and tensile strength so as to yield greater mobility of sodium polysulfide ($Na_2S_x$) within the current collector. Also, highly improved current collecting function is attained by virtue of use of knitted or woven yarn, and excellent corrosion resistance and high mechanical strength is attained by virtue of the use of carbon yarn of high elastic modulus and tensile strength, resulting in a storage battery having excellent discharge performance and durability.

14 Claims, 13 Drawing Figures

LONG STITCHES

FIG. 8B.

SHORT STITCHES

FIG. 8C.

GARTER STITCHES

FIG. 8D.

RIB STITCHES

PLAIN WEAVING

FIG. 8E.

TWILLING

FIG. 8F.

SODIUM-SULFUR STORAGE BATTERY

BACKGROUND OF THE INVENTION

1. Field of the Invention

The present invention relates to a sodium-sulfur storage battery having high discharge efficiency throughout repeated charge and discharge operations for a long period of time.

2. Description of the Prior Art

The conventional sodium-sulfur storage battery includes a solid electrolyte as a separator through which only sodium ions can be passed, molten sodium being disposed on one side of the solid electrolyte as a negative pole, or sodium electrode, molten sulfur being disposed on the other side of the solid electrolyte as a positive pole, or sulfur electrode, and a porous current collector impregnated with the molten sulfur and being in contact with the solid electrolyte. During the discharge of the battery, the sodium is ionized, and these ions pass through the solid electrolyte to react with sulfur in the current collector to form sodium polysulfide. The energy generated by this reaction is electrically taken out of the battery through its terminals. During the subsequent charge of the battery, current is supplied from an external source in the reverse direction, and the sodium in the sodium polysulfide produced by the discharge reaction passes as a sodium ion back to the negative pole through the solid electrolyte, and then becomes metallic sodium by adding an electron. Thus, during the discharge operation, sodium polysulfide is produced in the porous current collector, while in the charge operation, the sodium polysulfide is decomposed and sodium is moved toward the negative pole.

The sodium polysulfide in the porous current collector will be called $Na_2S_r$ hereinafter. The melting point of the $Na_2S_r$ depends on the molar fraction of the sodium in the $Na_2S_r$. For example, when the operating temperature of the battery is 300°C, the critical composition of $Na_2S_r$ to hold the molten state thereof is $Na_2S_{2.8}$. The melting point of $Na_2S_r$ is raised with the increment of the molar fraction of sodium in the $Na_2S_r$, and, therefore, it is necessary that $Na_2S_r$ of high molar fraction of sodium produced near the solid electrolyte during discharge be instantly and rapidly moved to that part of the porous current collector which is further from the solid electrolyte, that is, to the external part of the current collector, so that the molar fraction of sodium in $Na_2S_r$ in the current collector is lowered substantially uniformly. When the $Na_2S_r$ of high molar fraction of sodium produced near the solid electrolyte is not moved to the further part, such molar fraction is further raised and the $Na_2S_r$ is finally solidified. As a result, the terminal voltage of the storage battery is abruptly lowered. Further, in such case, $Na_2S_r$ of low molar fraction of sodium, or sulfur not yet reacted which is present in that part of the porous current collector furthest from the solid electrolyte cannot be moved toward the part near the solid electrolyte for reaction, so that discharge operation becomes impossible. Consequently, the sulfur in the battery cannot be used sufficiently. During the subsequent charge operation, sodium in the $Na_2S_r$ is moved back to the negative pole side as a sodium ion through the solid electrolyte, so it is necessary that the $Na_2S_r$ of high molar fraction of sodium in the porous current collector be rapidly moved to the part near the solid electrolyte. When the $Na_2S_r$ is not moved to the part near the solid electrolyte, sodium ions at that part become insufficient, and as a result, the over-voltage becomes larger and the charge voltage is abruptly raised. Then, the watt-hour efficiency of charge is greatly reduced and the discharge efficiency of the subsequent discharge operation is lowered.

As described above, it is clearly necessary that the porous current collector provide high mobility of the $Na_2S_r$ therein and have a high current collecting function, but such is not true of conventional current collectors in use. In addition, the porous current collector should have excellent corrosion resistance and high mechanical strength in order that the storage battery can maintain high performance through repeated charge-discharge operations for a long period of time, and this also is not evident in the operation of the conventional sodium-sulfur batteries.

Since the molten sulfur and the $Na_2S_r$ are very corrosive, and since the porous current collector is used as the positive pole during the charge operation, the current collector easily suffers corrosion. It is further explained, that the porous current collector receives a force due to the flow of $Na_2S_r$ during the charge-discharge operations. For example, when the discharge current is 0.2A per square centimeter of the solid electrolyte, sodium ions passing through the solid electrolyte per unit area (square centimeter) and per unit time (hour) is about 0.008 g.ions, and when $Na_2S_5$ is produced as a result of the reaction of the sodium ions with sulfur, the moving velocity of $Na_2S_5$ becomes about 2.4$^{mm}$/Hr, provided that the $Na_2S_5$ continuously moves in the perpendicular direction to the surface of the solid electrolyte. This moving velocity is low, but the $Na_2S_5$ has very high viscosity and the flow of the $Na_2S_5$ is obstructed by the porous current collector. Therefore, the current collector receives a considerable force, and it is presumed that the moving velocity in parts thereof where the $Na_2S_r$ passes becomes several, or 10 and several times the velocity mentioned above. During charge of the battery, a similar force and a similar moving velocity of the $Na_2S_r$ are caused in the reverse direction. Thus, the porous current collector is repetitively deformed due to the movement of the $Na_2S_r$ during the repeated discharge-charge operations, and as a result, the current collector finally becomes fragile and is broken. The broken fragments, or minute particles of the current collector are floated in the $Na_2S_r$, and they gradually fill up the gaps in the porous current collector in accordance with the movement of the $Na_2S_r$, which results in obstructing the further movement of the $Na_2S_r$ and, therefore, reducing the capacity of the battery.

For the reasons given in the preceding paragraph, the porous current collector is required to have excellent corrosion resistance and high mechanical strength, characteristics which are not present in conventional current collectors.

Conventionally, felt or carbon, or graphite yarn is employed as a porous current collector in a sodium-sulfur storage battery, such felt or yarn being disposed in contact with the solid electrolyte and being pressed against the solid electrolyte by a metal backing plate. Pressing the felt or yarn too much will increase the current collecting characteristic, but will obstruct the movement of the $Na_2S_r$, while pressing the felt or yarn only softly will avoid obstructing the movement of the Na$_2$S$_x$, but will reduce the current collecting characteristic. Therefore, it is very difficult to suitably adjust the pressing force. Normally, the felt, or carbon, or graphite yarn used in the conventional current collector is made by heating at high temperature the usual pitch fibers or organic fibers as they are, or in the woven state, to carbonize or graphitize the same. The obtained materials when employed as the porous current collector of the sodium-sulfur storage battery are corroded and decomposed by the Na$_2$S$_x$, or the like, during the repeated charge-discharge operations. Moreover, they are deprived of their fibrous shape due to the mechanical load caused by movement of the Na$_2$S$_x$, and finally disintegrate into minute particles.

Thus, the porous current collector of the conventional sodium-sulfur storage battery does not exhibit satisfactory performance after repeated use, and the need for development of a porous current collector which meets the above-mentioned requirements is very apparent.

SUMMARY OF THE INVENTION

The present invention relates to a sodium-sulfur storage battery provided with a porous current collector which overcomes the above-mentioned defects of conventional current collectors and meets the above-mentioned requirements for their improvement. The porous current collector of the invention is characterized in that a knitted, or woven carbon, or graphite yarn composed of carbon or graphite monofilaments of high elastic modulus and tensile strength is employed to form the porous current collector. Hereinafter, the term carbon includes both carbon and graphite.

In the present invention, the carbon monofilaments of high elastic modulus and tensile strength are made by heating the material fibers such as rayon fibers in their elongated state so as to carbonize, or graphitize the same, and the obtained carbon monofilaments are formed into carbon yarn. In the carbon monofilaments made by heating material fibers in their elongated condition, the crystals in the monofilaments are oriented in the direction of the fiber axes, and such monofilaments have high elastic modulus and tensile strength. By contrast, in the conventional carbon monofilaments which are made without being elongated, the crystal orientation cannot be recognized at all by X-ray diffraction method. Thus, the crystal orientation is one of the features of the above-mentioned carbon monofilaments of high elastic modulus and tensile strength. The degree of such crystal orientation need not be remarkably high. For example, according to measurements taken by the inventors, the degree of crystal orientation was about 10% in the monofilament having an elastic modulus of 30 tons/mm$^2$. The degree of crystal orientation is related to the elastic modulus and tensile strength, and the monofilament with the higher degree of crystal orientation has the higher elastic modulus and tensile strength. The carbon monofilament to be employed in the present invention should preferably have an elastic modulus of not less than 15 tons/mm$^2$ and a tensile strength not less than 100 kg/mm$^2$ to obtain the requisite durability. In contrast, the conventional carbon or graphite monofilament has an elastic modulus within the range from 4 to 8 tons/mm$^2$ and a tensile strength from 30 to 80 kg/mm$^2$, so both the elastic modulus and tensile strength thereof are considerably lower than those of carbon monofilament to be employed in the present invention.

The inventors of the present invention have confirmed by various experiments that the use of the yarn formed of monofilaments having high elastic modulus and tensile strength has remarkable effect in providing the porous current collector with corrosion resistance, mechanical strength and durability, and particularly the knitted or woven yarn is effective in view of easy movement of polysulfide and sulfur therethrough and excellent current collecting function.

The knitted yarn for use in the porous current collector of the present invention is obtained by knitting the above-mentioned carbon yarn formed of carbon monofilaments of high elastic modulus and tensile strength by using crochet needles, bar needles, afghan needles, or knitting machines. This knitting may be carried out as in knitting clothing, or the like. For example, the knitting may use long stitches, short stitches, garter stitches, rib stitches, hosiery stitches, or afghan stitches.

The woven carbon yarn for use in making the porous current collector of the present invention may also be formed by weaving, i.e., intersecting a plurality of the above-mentioned carbon yarns formed of carbon monofilaments substantially at right angles as in weaving cloth for clothing, and the like. For example, the collector may be woven by plain weaving, twilling, or braiding. The carbon yarn may be knitted or woven into a suitable form such as a tubular form, or a planar sheet of cloth so as to be disposed on the sulfur side of the solid electrolyte. The porous current collector made of knitted, or woven carbon yarn composed of carbon monofilaments of high elastic modulus and tensile strength is disposed, according to the present invention, on the positive pole (sulfur electrode) side of the solid electrolyte in contact therewith. When a solid electrolyte of tubular shape is used, a tubular solid electrolyte is inserted into a tubular current collector, and when a solid electrolyte of planar shape is used, a planar-shaped current collector is disposed in face contact with the solid electrolyte and a backing plate having a plurality of holes is disposed on the opposite side for holding the current collector. When the porous current collector is of tubular shape, it is preferable to provide a backing plate having a plurality of holes in contact with the exterior of the current collector for holding the same. This backing plate may be of metallic material and will also function as the positive pole current collector to be connected to the positive pole terminal. The backing plate may be provided with a plurality of sharp edged lugs at its upper and lower ends to be engaged with the battery container. Further, in case of use of a tubular porous current collector, it is preferable that the inner diameter thereof be formed a little smaller than the outer diameter of the solid electroyte, so that the tubular current collector is expanded slightly when the tubular solid electrolyte is inserted therein to enable the current collector to be tightly maintained between the backing plate and the solid electrolyte. This also expands the knitting stitches, or weaving meshes of the current collector and permits the Na$_2$S$_x$ to move easily therethrough.

The battery container may be made of metallic material such as stainless steel, or the like, in which case the container also functions as the positive pole current collector, but the battery container can be made of non-conductive material such as glass, ceramics, or the like, in which case a current collecting rod is directly inserted into the porous current collector, or a backing plate is used as the current collector, such rod or plate being directly connected electrically with the positive pole terminal. The battery container may be of tubular shape, or box shape, and within the container is provided one or more cells connected either in series or parallel, each cell being provided with negative and positive half-cell units. Beta-alumina, or the like, is preferably employed as the material for the solid electrolyte by which the sodium electrode is separated from the sulfur electrode. The solid electrolyte may be either of a tubular shape, or of planar shape. In the latter case, the battery container is separated into two chambers, namely, a left and right chamber. In both cases, sodium and sulfur are separated from each other by the solid electrolyte therebetween.

The porous current collector of the present invention is formed of knitted, or woven carbon yarn of high elastic modulus and tensile strength so that the collector has minute, long and slender gaps between the monofilaments forming each carbon yarn, and thus, it is porous as a whole. Since the carbon yarn is knitted, or woven by being mutually intersected, these yarns alternately appear on the front surface of the current collector (or the outer surface of the tubular current collector) and on the back surface (or the inner surface thereof) as in waves. When such current collector is disposed in contact with the solid electrolyte, the carbon yarn is alternately made to contact with the solid electrolyte and with the opposite side part where abundant sulfur exists, and again with the solid electrolyte. Thus, long and slender gaps between the monofilaments forming each carbon yarn are directed substantially perpendicularly to the solid electrolyte. The $Na_2S_x$ produced in the yarn of the collector during the discharge of the battery is easily moved through the gaps to the portion of the collector distant from the solid electrolyte and thence to the sulfur bath, and at the same time sulfur not yet reacted can be easily supplied to the part near the solid electrolyte. On the other hand, during charging of the battery, the $Na_2S_x$ can be easily moved in the reverse direction for the same reason as described above. Moreover, the spaces, or gaps between the knitting stitches, or weaving meshes of the knitted, or woven carbon yarn are relatively large, and are perpendicular to the solid electrolyte, so that the $Na_2S_x$ can be moved more easily. The portions of the yarn forming each knitting stitch, or weaving mesh, are sufficiently close to one another that the electrical energy generated in these portions of the yarn can be effectively collected and brought to the positive pole terminal. With a knitted type current collector, the fiber yarn comes in and out between the front and back surfaces of the collector more often than in a woven type current collector and more gaps of monofilaments of carbon yarn are directed perpendicularly to the solid electrolyte, so that the $Na_2S_x$ is moved faster from the solid electrolyte to the portion of the battery where abundant sulfur exists and a superior storage battery is provided.

For comparison, in the conventional storage battery the carbon yarn is just wound around the solid electrolyte and, therefore, the gaps in the monofilaments of the carbon yarn are nearly parallel to the solid electrolyte and no gaps in the perpendicular direction to the solid electrolyte are present as in the present invention. Therefore, the movement of $Na_2S_x$ is obstructed.

From the above it should be apparent that a primary object of the present invention is to provide a porous current collector in a sodium-sulfur storage battery which overcomes the disadvantages and defects of conventional current collectors.

It is an important object of the invention to form the porous current collector of carbon yarn of high elastic modulus and tensile strength in which the crystals are oriented so that the collector will exhibit high corrosion resistance in the corrosive atmosphere such as sulfur, $Na_2S_x$, or the like, so that it will strongly resist the forces generated by movement, or flow of the $Na_2S_x$ occurring during the charge and discharge operations of the battery.

Another object of the present invention is to provide a current collector having excellent corrosion resistance and high mechanical strength.

A further object of the present invention is to provide a current collector which can attain easy mobility of sodium polysulfide produced therein during the discharge operation and highly improved current collecting function.

A still further object of the present invention is to provide a current collector in which the sodium polysulfide of low molar fraction of sodium or sulfur not yet reacted can be easily moved.

BRIEF DESCRIPTION OF THE DRAWINGS

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several Figures, and in which:

FIGS. 8A–8F are fragmentary details of still other porous current collectors illustrating different types of knitting stitches and weaving which may be utilized in forming still other embodiments of the current collector according to the present invention.

DESCRIPTION OF THE PREFERRED EMBODIMENTS

Embodiment 1

Figures 1, 2, 3, 4, 5:
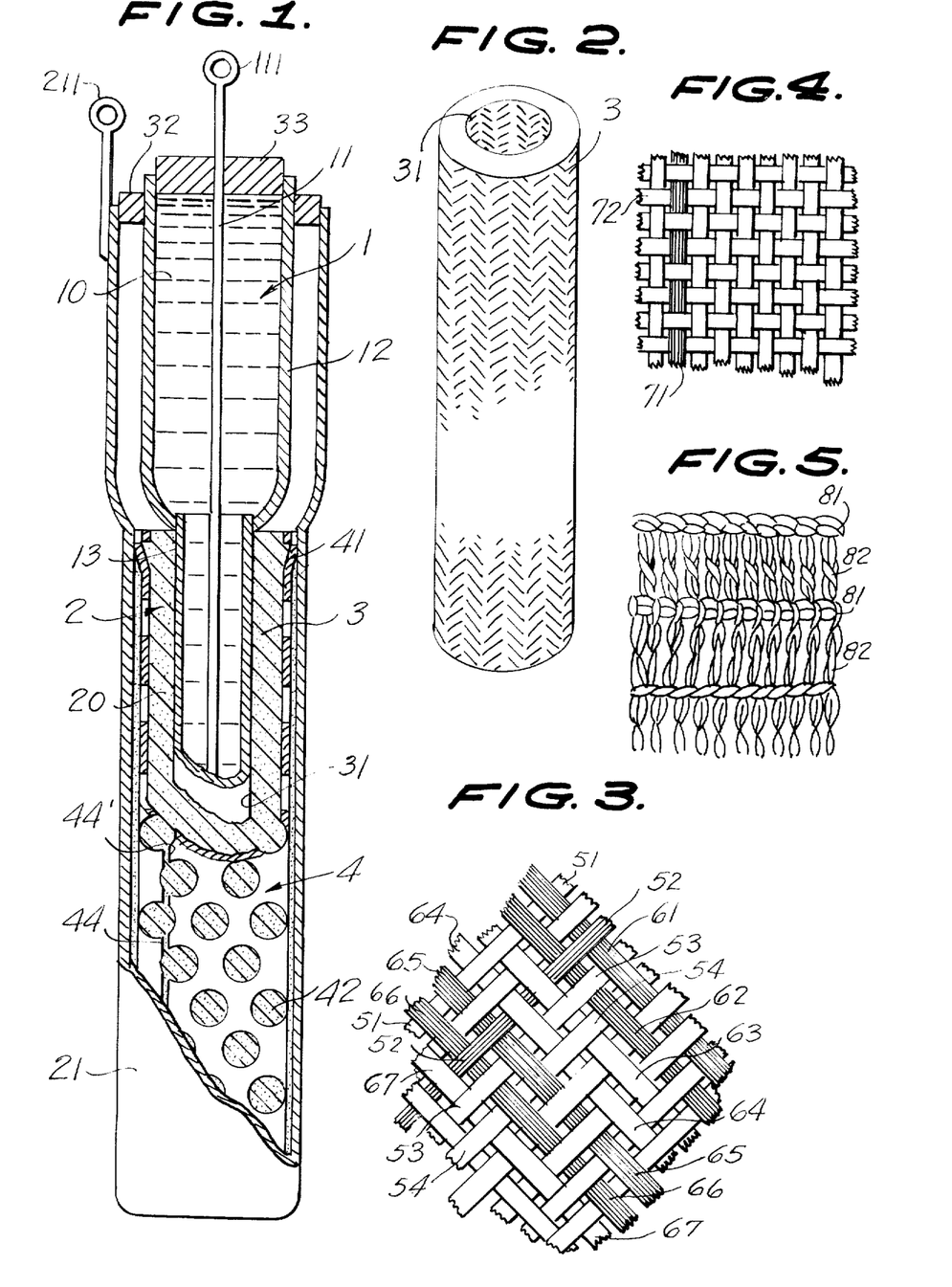
FIG. 1 is a perspective view of a sodium-sulfur storage battery according to the invention with portions of the exterior housing and internal components removed to illustrate these and other internal components, their arrangement and function.
FIG. 2 is a perspective view of the porous current collector used in the battery of FIG. 1.
FIG. 3 is a fragmentary detail of the woven, or braided carbon yarn forming the current collector of FIG. 2.
FIG. 4 is a fragmentary detail of woven carbon yarn illustrating another embodiment of the porous current collector.
FIG. 5 is a fragmentary detail of the carbon yarn knitted in long stitches as may be used in another embodiment of the porous current collector.

The sodium-sulfur storage battery of this embodiment was constructed as illustrated in FIG. 1. A tubular sodium Beta-alumina tube 13 was disposed as the solid electrolyte in the tubular stainless steel battery container 21, and the tubular porous current collector 3 which was made by weaving or braiding the carbon yarns of high elastic modulus and tensile strength was disposed around the solid electrolyte tube 13. A tubular backing plate 4 having many spaced holes 42 was disposed around the current collector 3. The reservoir for sodium 12 was made of alumina and was provided at the upper end of the Beta-alumina tube 13. The molten sodium 10 and the negative current collecting rod 11 were inserted into the tube 13 and reservoir 12 to form the sodium electrode 1 as a negative pole. The molten sulfur 20 was filled in between the battery container 21 and the Beta-alumina tube 13 up to the top end of the tubular current collector 3 which was thus abundantly impregnated with the molten sulfur, thereby to form the sulfur electrode 2 as a positive pole. In FIG. 1, 111 is the negative pole terminal, and 211 is the positive pole terminal.

The current collector 3 was made by weaving, or braiding a plurality of carbon yarns into tubular shape, as shown in FIG. 2. As illustrated in FIG. 3, the manner of weaving was such that the yarn 51 intersects and goes under two yarns 61,62 and then intersects and goes over the other two yarns 63,64, and further intersects and goes under two yarns 65,66, thereby weaving the carbon yarns 51,52, 53 — which run diagonally from the upper part on the righthand side of the woven materials, as illustrated in FIG. 3, to the lower part on the lefthand side, and the carbon yarns 61,62,63 — which run diagonally from the upper part on the lefthand side to the lower part on the righthand side. Each carbon yarn was composed of about 1500 carbon monofilaments of high elastic modulus and tensile strength having a diameter of about 6 microns, and the thickness of the resultant tubular current collector was about 3mm. The carbon monofilaments forming the carbon yarn had an elastic modulus of about 20 tons/mm$^2$ and a tensile strength of about 200 kg/mm$^2$. The inner diameter of the tubular current collector 3 was a little smaller than the outer diameter of the Beta-alumina tube 13. Therefore, by inserting the tube 13 into the tubular current collector 3, the current collector was expanded and the meshes between the woven yarns forming the current collector were enlarged to make large spaces, or gaps therebetween perpendicular to the axial direction of the tube 13. The outer diameter of the tubular current collector 3 was a little bit larger than the inner diameter of the backing plate 4.

The tubular backing plate 4 was formed by bending a stainless steel plate having a plurality of round holes 42 nearly uniformly spaced therein into a tubular shape so that the opposite edges 44,44' were made to abut each other. The upper and lower ends of the backing plate were bent outwardly to form four lugs 41 at each end. Each two of the four lugs were mutually opposed diametrically of the backing plate 4. The distance between the mutually opposed lugs 41 is a little larger than the inner diameter of the battery container 21. When the backing plate 4 was inserted into the battery container 21, the sharp edges of the lugs 41 bit into the inner wall of the container 21 and the tubular backing plate 4 was thus fixedly held in the container with the edges 44,44' in contact with each other.

In constructing the battery the Beta-alumina tube 13 was first inserted into the inner part 31 of the tubular current collector 3, and then these were inserted into the tubular backing plate 4. At this time, both end surfaces 44,44' of the tubular backing plate 4 were not yet in contact with each other. Then, the tubular backing plate 4 together with the tube 13 and the current collector 3 were inserted into the battery container 21 to make both the edges 44,44' contact each other in abutting relation, whereby these parts were fixed in the container 21 by the lugs 41. Thereafter, the molten sulfur was poured to fill the collector 3 between the container 21 and the tube 13 to form the sulfur electrode 2 and the molten sodium was poured into the Beta-alumina tube 13 and the reservoir 12 to form the sodium electrode 1. The negative pole 11 was then inserted into the sodium electrode. Silicon rubber plugs 32,33 were disposed at the top of the sulfur and sodium electrodes, respectively.

In the battery as constructed above, the current collector 3 is electrically connected to the battery container 21 through the backing plate 4 and its lugs 41 in the sulfur electrode 2. Here, the battery container 21 also functions as the positive pole current collector.

As described above, the current collector 3 obtained by weaving, or braiding the carbon yarns of high elastic modulus and tensile strength is disposed between the Beta-alumina tube 13 and the backing plate 4, and the Beta-alumina tube 13 is connected to the sulfur bath through the slender gaps of monofilaments of the carbon yarns forming the current collector 3 and also through the gaps between the woven carbon yarns. Therefore, the Na$_2$S$_x$ can be easily moved during operation of the battery. Further, the carbon yarns are sufficiently close to one another, so that good current collecting characteristics can be realized.

Figure 6:
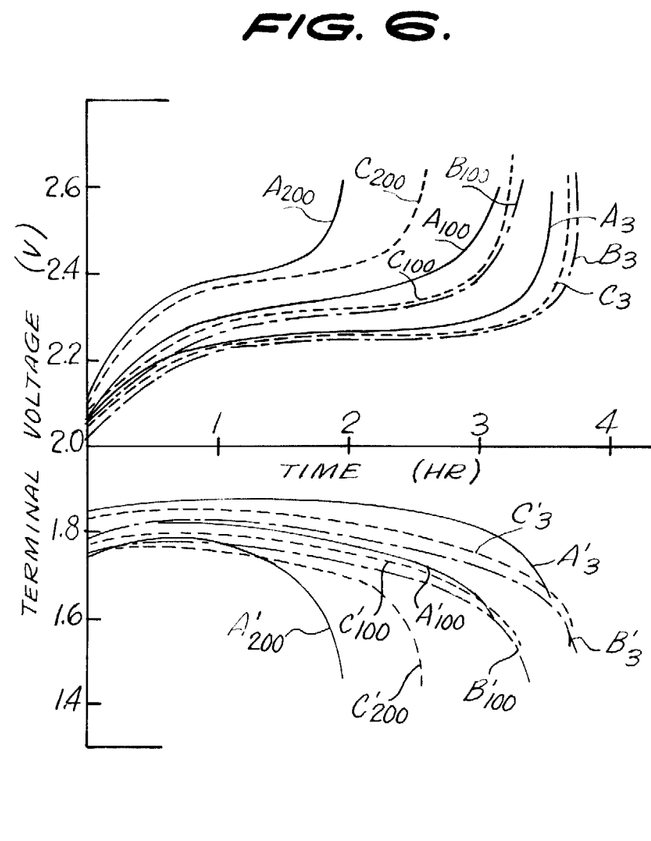
FIg. 6 is a graph showing test results of batteries constructed with various embodiments of the present invention.

In operation, the battery was placed in a tub for heating except for its upper part, and with sodium and sulfur loaded into the sodium electrode 1 and the sulfur electrode 2, as well as their reservoirs, the battery was heated to operating temperature of 300°C. Repetitive charge-discharge operations were carried out and the charge-discharge time (hour) were measured versus the terminal voltage during each charge-discharge cycle. The results of these measurements are shown in FIG. 6, in which the curved lines marked by references A$_3$, A'$_3$; A$_{100}$, A'$_{100}$; and A$_{200}$, A'$_{200}$ show the terminal voltage at the 3rd, 100th and 200th charge-discharge cycle, respectively, taking the charge-discharge time as the abscissa and the terminal voltage as the ordinate. As is apparent from FIG. 6, the terminal voltage does not change very much during the repeated charge-discharge operations. For example, the terminal voltage of the 100th charge is only a little higher than the terminal voltage at the 3rd charge. Similarly, the terminal voltage at the 100th discharge is only a little lower than at the 3rd discharge. With the charge-discharge time of 2½ hours at the 100th charge-discharge cycle, the charge voltage is as low as about 2.4 volts, and the discharge voltage is as high as about 1.75 volts. With the charge-discharge time of 1½ hours at the 200th charge-discharge cycle, the charge voltage is as low as about 2.43 volts, and the discharge voltage as high as about 1.72 volts. These values show that the battery has excellent performance particularly, as compared with the comparison values shown in FIG. 7 which will be described later.

From the above, it is clear that the storage battery of this embodiment has superior charge-discharge efficiency, and is suitable for use in repetitive charge-discharge operations for a long period of time.

Embodiment 2

Each yarn was composed of about 2,000 carbon monofilaments of high elastic modulus and tensile strength as in Embodiment 1, and a plurality of carbon yarns were woven into a sheet of cloth, as shown in FIG. 4. Five sheets of such cloth were mutually superimposed and formed into tubular shape to produce a current collector in which the opposed edge surfaces of each cloth along the axial direction of the tubular shape were combined together with the same carbon yarn of high elastic modulus and tensile strength. The planar weaving was, as shown in FIG. 4, such that the yarns 71 in the vertical direction and the yarns 72 in the horizontal direction intersected one another and passed alternately over and under one another. The inner diameter of the current collector was made a little bit smaller than that of the Beta-alumina tube 13, and the thickness of the current collector was about 3mm.

The tubular current collector thus made of plain woven cloth was disposed in the sodium-sulfur storage battery as in Embodiment 1, and the tests of the repetitive charge-discharge cycles were made under the same conditions as in Embodiment 1. The results are shown in FIG. 6 in which the curved dotted-chain lines marked by the references $B_3$ and $B'_3$ show the terminal voltage at the 3rd charge-discharge cycle, and those marked by $B_{100}$ and $B'_{100}$ show the terminal voltage at the 100th charge-discharge cycle, respectively.

As apparent in FIG. 6, in this second embodiment, the terminal voltage during charge is nearly equal to, or lower than that of Embodiment 1, and the terminal voltage during discharge is a little bit lower than that of Embodiment 1, but the values are still high. Further, the terminal voltage even at the 100th discharge is high and not very much lowered as compared with that of the 3rd discharge.

Embodiment 3

The carbon yarn was composed of about 8,000 carbon monofilaments of high elastic modulus and tensile strength as in Embodiment 1, and it was knitted in long stitches as shown in FIG. 5, into a tubular current collector having an inner diameter slightly smaller that that of the Beta-alumina tube 13, and a thickness of about 3mm. In this embodiment, one continuous yarn was used and knitted in normal long stitches as shown in FIG. 5, in which the parts 81 of the carbon yarn run in the circumferential direction of the tubular member to be formed, and the parts 82 of the carbon yarn run in the axial direction of the tubular member, the parts 81 being interconnected through the parts 82.

Using this tubular current collector, the tests of the repetitive charge-discharge cycles were performed under the same conditions as in Embodiment 1. The results are shown in FIG. 6, in which the curved chain lines referenced $C_3$, $C'_3$, $C_{100}$, $C'_{100}$ and $C_{200}$, $C'_{200}$ show the terminal voltage at the 3rd, 100th and 200th charge-discharge cycles, respectively.

As apparent from FIG. 6, up to the 100th cycle the terminal voltage in the charge operation in this embodiment is nearly equal to that of the above Embodiment 2, in which plain-woven cloth was used, and the terminal voltage in the discharge operation is higher than that of Embodiment 2. With a charge-discharge time of 2 hours at the 200th cycle, the charge voltage is as low as about 2.43 volts and the discharge voltage is as high as 1.7 volts. From these values, it is apparent that the current collector made of knitted yarn is superior to the current collector made of braided, or woven yarn as in Embodiment 1.

Embodiment 4

Two carbon yarns were prepared using two kinds of carbon monofilaments of high elastic modulus and tensile strength; i. e., Samples 1 and 2 shown in Table 1, and each carbon yarn was knitted with normal long stitches, as in Embodiment 3, into a tubular current collector. The carbon yarn of Sample 1 was composed of 1,400 minofilaments, and that of Sample 2 of about 12,000 monofilaments.

The tests of the repetitive charge-discharge cycles were performed by employing the current collector under the same conditions as in Embodiment 1. The results are shown in Table 2 in which the discharge capacity (ampere hours) and the peak terminal voltage (volts) at the 3rd, 50th and 100th discharge cycles are shown. In Table 2, AH means the discharge capacity in ampere hours, and PV means the peak discharge terminal voltage in volts.

TABLE 1

| Sample Number | Elastic Modulus (tons/mm²) | Tensile Strength (kg/mm²) | Monofilament Diameter ($\mu$) |
|---|---|---|---|
| 1 | 22 | 250 | 6 |
| 2 | 37 | 210 | 7 |

TABLE 2

| Discharge Times | Sample 1 | | Sample 2 | |
|---|---|---|---|---|
| | AH (Ahr) | PV (V) | AH (Ahr) | PV (V) |
| 3 | 7.4 | 1.85 | 7.5 | 1.86 |
| 50 | 7.1 | 1.82 | 7.1 | 1.83 |
| 100 | 6.6 | 1.79 | 6.6 | 1.82 |

As is apparent from Table 2, high discharge capacity and high discharge voltage are shown for both samples, and they are not very different even after subjection to numerous charge-discharge cycles. Thus, it is recognized that the battery performance for this embodiment is nearly equal to, or better than those of Embodiments 1, 2 and 3.

COMPARISON EXAMPLE No. 1

A sodium-sulfur storage battery of conventional type was constructed, and tests of the repetitive charge-discharge cycles were performed. In this case, the current collector was formed of graphite yarn composed of about 20,000 conventional graphite monofilaments having a diameter of 13 microns, an elastic modulus of about 6 tons/mm² and a tensile strength of about 70 kg/mm². The graphite yarn was wound around the outer circumference of the Beta-alumina tube to the thickness of about 3mm. Except for the above, the construction of the battery was the same as in Embodiment 1. The tests were performed under the same conditions as in Embodiment 1.

Figure 7:
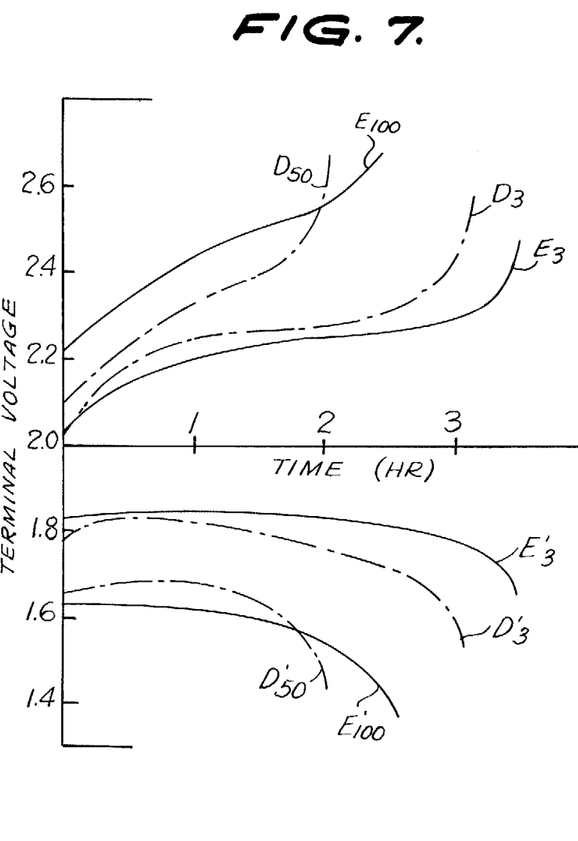
FIG. 7 is a graph similar to FIG. 6 showing the test results of conventional batteries for comparison purposes.
Figure 8A:
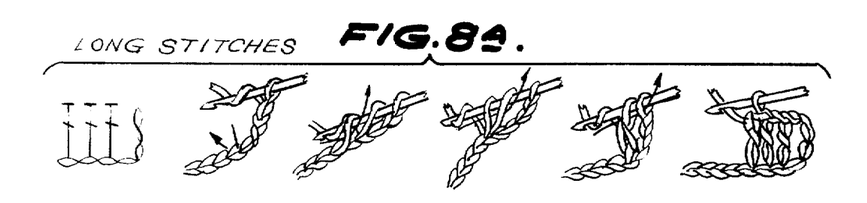
Figure 8B:
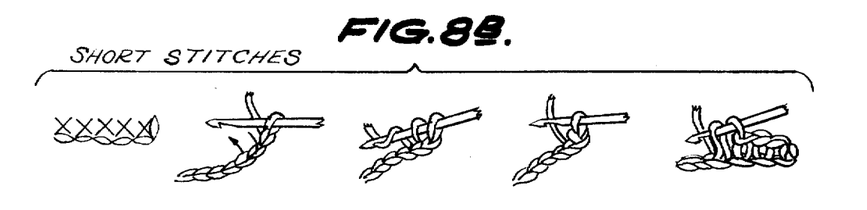
Figure 8C:
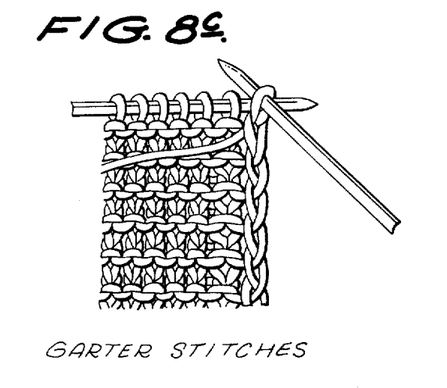
Figure 8D:
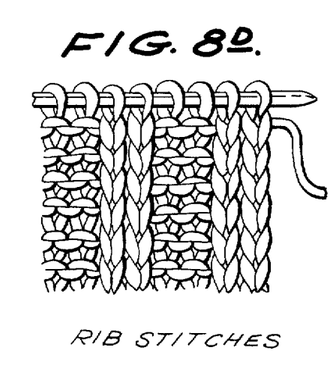
Figure 8E:
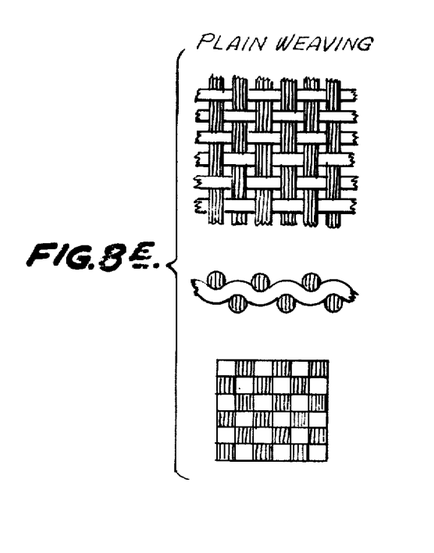

The test results are shown in FIG. 7, in which the curved single-dotted-chain lines referenced $D_3$, $D'_3$ show the terminal voltage at the 3rd charge-discharge, and the curved single-dotted-chain lines referenced $D_{50}$, $D'_{50}$ show the terminal voltage at the 50th charge-discharge. Comparing the results of FIG. 7 with those shown in FIG. 6, in this example, the values of the 3rd charge-discharge are nearly equal to those of the Embodiments 1–3 ($A_3$, $B_3$, $C_3$, $A'_3$, $B'_3$, $C'_3$ in FIG. 6), but at the 50th cycle, the charge voltage is much increased in comparison with that of the 3rd charge and the discharge voltage is greatly lowered. Also, it is recognized that these values are remarkably inferior to those of the 100th charge-discharge in Embodiment 1 through Embodiment 3.

COMPARISON EXAMPLE No. 2

The yarn was composed of 4,000 conventional graphite monofilaments as in above Example 1, and a plurality of such fiber yarns were woven, or braided in the same manner as in Embodiment 1 to form a tubular current collector. The storage battery was constructed similarly to that of Embodiment 1. Tests of the repetitive charge-discharge were performed under the same conditions as in Embodiment 1.

The test results are shown in FIG. 7 in which the curved full lines referenced $E_3$, $E'_3$ and $E_{100}$, $E'_{100}$ show the terminal voltage at the 3rd and 100th charge-discharge cycle, respectively.

As is apparent from comparing FIG. 7 with FIG. 6, the values at the 3rd charge-discharge cycle are nearly equal to those of Embodiments 1 through 3, but at the 100th cycle, the charge voltage becomes considerably higher and the discharge voltage becomes considerably lower as compared with those of the 3rd cycle. Also, it is shown that the discharge capacity at the 100th discharge cycle is considerably smaller than the corresponding values of discharge capacity for the Embodiments 1–4. This fact shows that the porous current collector of this comparison Example 2, as well as Comparison Example 1, has very poor durability.

In both Comparison Examples 1 and 2, the current collectors were considerably damaged after the tests, and when they were taken out of the batteries they were found to be severely corroded and easily broken by merely washing with water. In contrast, the porous current collectors in the above-described embodiments of the present invention, when taken out of the batteries after tests, were found to retain their initial form, and since they were not broken down under washing, they could be used again.

As is apparent from the test results of Embodiments 1–4 when compared with the Comparison Examples 1 and 2, the sodium-sulfur storage battery of the present invention is superior both to the conventional battery (Comparison Example 1) and to a battery provided with a current collector formed by weaving conventional graphite yarns (Comparison Example 2), in that the charge voltage is low and is only slightly increased by repetitive charge-discharge operations, and on the other hand, the discharge voltage is high and is only slightly lowered by repetitive charge-discharge operations. Also, the battery of the present invention has a large discharge capacity. Thus, the storage battery according to the invention has good performance and excellent durability, making full use of sulfur as an active material.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A sodium-sulfur storage battery comprising in combination a battery container,
   at least one negative half-cell unit within said battery container defining a sodium chamber,
   molten sodium within said sodium chamber,
   a negative conductor extending from within said sodium chamber,
   at least one positive half-cell unit within said battery container defining a sulfur chamber,
   molten sulfur within said sulfur chamber,
   a positive conductor,
   a solid electrolyte between said negative and positive half-cell units for separating said sodium chamber from said sulfur chamber and passing only sodium ions therethrough, and
   a porous current collector mesh within said positive half-cell unit in electrical contact with said positive conductor and a surface of said solid electrolyte,
   said porous current collector mesh being formed by interlacing carbon yarn composed of carbon monofilaments having an elastic modulus not less than 15 tons/mm$^2$ and a tensile strength not less than 100 kg/mm$^2$.

2. A sodium-sulfur storage battery according to claim 1, further comprising a backing plate for holding said porous current collector against said solid electrolyte.

3. A sodium-sulfur storage battery according to claim 2, wherein said backing plate is formed of metallic material and has a plurality of holes.

4. A sodium-sulfur storage battery according to claim 1, wherein said solid electrolyte is formed of sodium Beta-alumina.

5. A sodium-sulfur storage battery according to claim 4, wherein said solid electrolyte and said porous current collector mesh are of tubular shape.

6. A sodium-sulfur storage battery according to claim 5, further comprising a tubular metallic backing plate having a plurality of holes, and wherein said battery container is of a tubular shape.

7. A sodium-sulfur storage battery according to claim 6, further comprising a tubular sodium reservoir in said negative half-cell unit at the upper end of said tubular solid electrolyte, and a pair of plugs at the top of said negative and positive half-cell units, and wherein said backing plate has upper and lower ends being outwardly bent to form a plurality of sharp edged lugs which bite into the interior surface of said tubular battery container, and said battery container is formed of metallic material.

8. A sodium-sulfur storage battery according to claim 7, wherein said tubular porous current collector mesh is formed of braided carbon yarn composed of carbon monofilaments having an elastic modulus of about 20 tons/mm$^2$ and a tensile strength of about 200 kg/mm$^2$.

9. A sodium-sulfur storage battery according to claim 7, wherein said porous current collector mesh is formed of plain woven pieces of cloth of carbon yarns, said yarns being composed of carbon monofilaments having the elastic modulus of about 20 tons/mm$^2$ and the tensile strength of about 200 kg/mm$^2$.

10. A sodium-sulfur storage battery according to claim 7, wherein said porous current collector mesh is formed of carbon yarn knitted in long stitches, said carbon yarn being composed of carbon monofilaments having an elastic modulus of about 20 tons/mm$^2$ and a tensile strength of about 200 kg/mm$^2$.

11. A sodium-sulfur storage battery according to claim 1, wherein said porous current collector mesh is formed of said carbon yarn knitted in stitches.

12. A sodium-sulfur storage battery according to claim 1, wherein said porous current collector mesh is formed of said carbon yarn in woven state.

13. A sodium-sulfur storage battery according to claim 1, wherein said porous current collector mesh is formed of said carbon yarn braided.

14. A sodium-sulfur storage battery according to claim 1, wherein said porous current collector mesh is formed of said carbon yarn twilled.

* * * * *